Oct. 26, 1948.   A. G. HERRESHOFF ET AL   2,452,300
SUPERCHARGER
Filed April 13, 1944

INVENTORS.
Alexander G. Herreshoff,
Allen C. Staley.
BY
Harness and Harris
ATTORNEYS.

Patented Oct. 26, 1948

2,452,300

UNITED STATES PATENT OFFICE 2,452,300

SUPERCHARGER

Alexander G. Herreshoff, Grosse Pointe, and Allen C. Staley, Birmingham, Mich., assignors to Chrysler Corporation, Highland Park, Mich., a corporation of Delaware Application April 13, 1944, Serial No. 530,930

9 Claims. (Cl. 123—119)

This invention relates to a supercharger. More specifically it relates to means for controlling the flow of fuel and air to an engine with which the supercharger is connected.

It is known to by-pass a supercharger leading to an engine in order to reduce the amount of fuel and air fed to the engine. This arrangement provides under certain circumstances a more desirable control than does a throttle on the inlet side of the supercharger. A spill gate placed between the engine and the supercharger will waste fuel if it is introduced at the inlet side of the supercharger. If fuel is introduced by a carburetor between the supercharger and the engine, a spill gate between the supercharger and the engine will upset the carburetor control located at the inlet side of the supercharger. Thus a by-pass for the supercharger becomes most desirable, and the present invention relates to certain improvements involving a by-pass for a supercharger.

An object of the present invention is to provide improvements in the control of flow of fuel and a combustion-supporting gas to an engine. These improvements may be applied to a supercharger associated with the engine.

A further object is to improve the arrangement involving a supercharger and a by-pass therefor. The supercharger is to deliver air or a mixture of fuel to an engine, and a carburetor for the fuel may be located at the inlet side of the supercharger or between the supercharger and the engine.

Another object is to provide improvements in the arrangement of a temperature-controlling means with a supercharger or more specifically a supercharger provided with a by-pass.

Other objects will appear from the disclosure.

Figure 1:
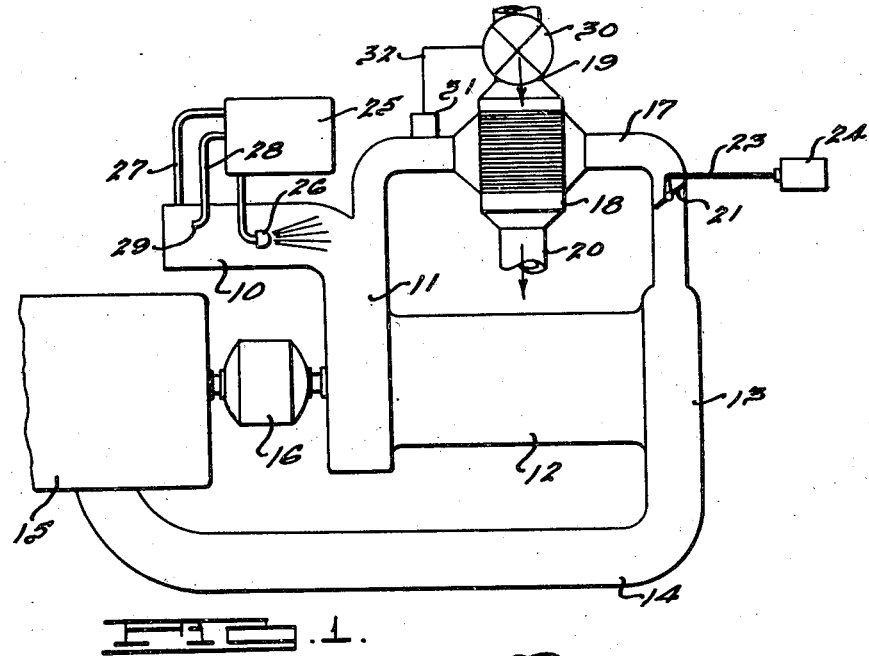
Fig. 1 is a view of one form of the present invention.

As seen in Fig. 1, an inlet line 10 leads to an inlet end 11 of an axial supercharger 12, to a delivery end 13 of which is connected a delivery line 14 leading to an engine 15. The supercharger 12 is driven by the engine 15 through means 16, which may be a speed-multiplying drive, since the speed of the supercharger may be high in comparison with that of the engine. A by-pass 17 leads from the delivery line 14 or the delivery end 13 of the supercharger to the inlet line 10 or the inlet end 11 of the supercharger. Associated with the by-pass 17 is a cooling means 18, to which a coolant such as a gas or a liquid may be supplied through an inlet pipe 19 and removed by an outlet pipe 20. A valve 21 is placed in the by-pass 17 and is connected by an arm 22 fixed to the valve and a link 23 to a means 24, which may be an automatic regulator for the valve 21 adapted to be operated by such conditions as engine speed or load or may be a manually controlled regulator. A carburetor 25 has a discharging nozzle 26 in the inlet line 10 for introducing fuel therein. The carburetor is controlled by a line 27 leading from the side of the inlet line 10 and a line 28 having a Pitot tube 29 within the inlet line 10. The difference in pressures communicated to the carburetor 25 through the lines 27 and 28 is a measure of the velocity head of air passing through the inlet line 10 to the supercharger 12. This difference in pressures or velocity head controls the amount of fuel introduced by the carburetor 25 through the nozzle 26 in the inlet line 10.

In operation, fuel and air pass from the inlet line 10, through the supercharger 12 and the delivery line 14, and into the engine 15. If the amount of fuel and air is too high, the valve 21 is opened so that fuel and air is by-passed through the by-pass 17 from the discharge end 13 of the supercharger to the inlet end. This action reduces the amount of fuel and air reaching the engine 15. Thus some fuel and air goes through the supercharger 12 at least twice, and with each passage through the supercharger, the heating may become considerable. The mixture of fuel and air reaching the engine may be too hot, and the supercharger may become overheated.

To overcome these drawbacks, the cooling means 18 has been provided. Coolant passing therethrough cools the mixture passing through the by-pass 17. Thus the by-passed mixture returning to the supercharger 12 is cooled so that there is no danger of overheating the supercharger or the mixture passing through the delivery line 14 to the engine 15. A valve 30 in the inlet 19 controls the cooling means 18 by regulating the quantity of coolant reaching the cooling means 18. The valve 30 is controlled by temperature of the gas in the portion of the by-pass 17 between the cooling means 18 and the inlet line 10 leading to the supercharger by means of a temperature-responsive device 31 associated with this portion of the by-pass and having operative connection with the valve 30 by diagrammatically represented means 32.

Figure 2:
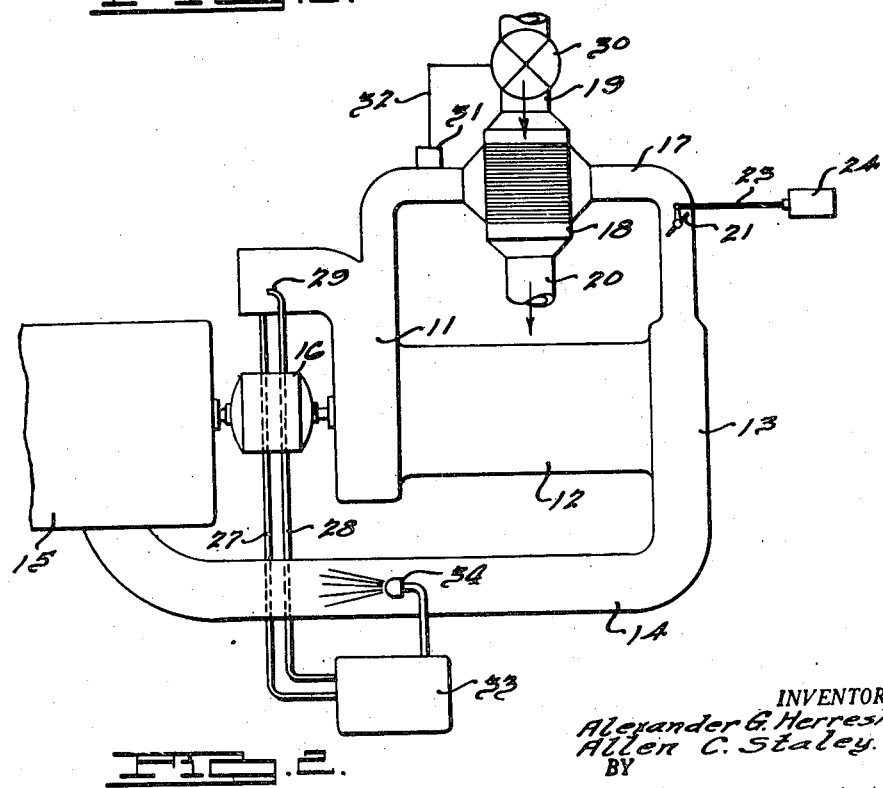
Fig. 2 is a view of a second form of the present invention.

The form of the invention of Fig. 2 is similar to that of Fig. 1 except that lines 27 and 28 leading from the inlet line 10 go to a carburetor 33 adjacent the delivery line 14 having a discharging nozzle 34 in the delivery line. Thus fuel is introduced between the supercharger 12 and the engine 15. Thus only air passes through the supercharger, and only air is by-passed through the by-pass 17 and is cooled by the cooling means 18. However, the same result is accomplished; the supercharger is kept from overheating, and the fuel and air reaching the engine 15 is not too hot.

The intention is to limit the invention only within the scope of the appended claims.

We claim:

1. In combination, a supercharger, an inlet line leading to the supercharger, an engine, a delivery line leading from the supercharger to the engine, means for introducing fuel for the engine in the inlet line, means responsive to rate of flow of air in the inlet line for controlling the fuel-introducing means, a by-pass for the supercharger leading from the delivery line to the inlet line, and cooling means associated with the by-pass.

2. In combination, a supercharger, an inlet line leading to the supercharger, an engine, a delivery line leading from the supercharger to the engine, means for introducing fuel for the engine in the delivery line, means responsive to rate of flow of air in the inlet line for controlling the fuel-introducing means, a by-pass for the supercharger leading from the delivery line to the inlet line, and cooling means associated with the by-pass.

3. In combination, a supercharger, an inlet line leading to the supercharger, an engine, a delivery line leading from the supercharger to the engine, means for introducing fuel for the engine in the inlet line, means responsive to rate of flow of air in the inlet line for controlling the fuel-introducing means, a by-pass for the supercharger leading from the delivery line to the inlet line, and temperature-controlling means associated with the by-pass.

4. In combination, a supercharger, an inlet line leading to the supercharger, an engine, a delivery line leading from the supercharger to the engine, means for introducing fuel for the engine in the delivery line, means responsive to rate of flow of air in the inlet line for controlling the fuel-introducing means, a by-pass for the supercharger leading from the delivery line to the inlet line, and temperature-controlling means associated with the by-pass.

5. In combination, an axial supercharger, an inlet line leading to the supercharger, an engine, a delivery line leading from the supercharger to the engine, a carburetor for introducing fuel in the inlet line, means responsive to velocity head in the intake line for controlling the amount of fuel supplied by the carburetor, a by-pass for the supercharger, cooling means associated with the by-pass, and means for adjusting the by-pass to control the amount of fuel fed to the engine.

6. In combination, an axial supercharger, an inlet line leading to the supercharger, an engine, a delivery line leading from the supercharger to the engine, a carburetor for introducing fuel in the delivery line, means responsive to velocity head in the intake line for controlling the amount of fuel supplied by the carburetor, a by-pass for the supercharger, cooling means associated with the by-pass, and means for adjusting the by-pass to control the amount of fuel fed to the engine.

7. In combination, a supercharger, an inlet line leading to the supercharger, an engine, a delivery line leading from the supercharger to the engine, means for introducing fuel for the engine in one of the lines, means responsive to rate of flow of air in the inlet line for controlling the fuel-introducing means, a by-pass for the supercharger leading from the delivery line to the inlet line, and cooling means associated with the by-pass.

8. In combination, a supercharger, an inlet line leading to the supercharger, an engine, a delivery line leading from the supercharger to the engine, means for introducing fuel for the engine in one of the lines, means responsive to rate of flow of air in the inlet line for controlling the fuel-introducing means, a by-pass for the supercharger leading from the delivery line to the inlet line, and temperature-controlling means associated with the by-pass.

9. In combination, an axial supercharger, an inlet line leading to the supercharger, an engine, a delivery line leading from the supercharger to the engine, a carburetor for introducing fuel in one of the lines, means responsive to velocity head in the intake line for controlling the amount of fuel supplied by the carburetor, a by-pass for the supercharger, cooling means associated with the by-pass, and means for adjusting the by-pass to control the amount of fuel fed to the engine.

ALEXANDER G. HERRESHOFF.
ALLEN C. STALEY.

REFERENCES CITED

The following references are of record in the file of this patent:

UNITED STATES PATENTS

| Number | Name | Date |
|---|---|---|
| 1,110,864 | Banner | Sept. 15, 1914 |
| 1,263,056 | Graemiger | Apr. 16, 1918 |
| 2,067,757 | Fielder | Jan. 12, 1937 |
| 2,067,984 | Ross | Jan. 19, 1937 |
| 2,239,305 | Tacconi | Apr. 22, 1941 |
| 2,292,233 | Lysholm | Aug. 4, 1942 |
| 2,311,936 | Elfes et al. | Feb. 23, 1943 |

FOREIGN PATENTS

| Number | Country | Date |
|---|---|---|
| 35,436 | Holland | Apr. 16, 1935 |
| 466,203 | England | May 18, 1937 |
| 523,895 | England | July 25, 1940 |
| 542,592 | England | Jan. 19, 1942 |